United States Patent
Taylor

(10) Patent No.: US 7,106,979 B1
(45) Date of Patent: Sep. 12, 2006

(54) POLARIZATION MODE DISPERSION COMPENSATING APPARATUS, SYSTEM, AND METHOD

(75) Inventor: Michael G. Taylor, Laurel, MD (US)

(73) Assignee: CIENA Corporation, Linthicum, MD (US)

(*) Notice: Subject to any disclaimer, the term of this patent is extended or adjusted under 35 U.S.C. 154(b) by 1052 days.

(21) Appl. No.: 09/697,703

(22) Filed: Oct. 27, 2000

(51) Int. Cl.
*H04B 10/00* (2006.01)

(52) U.S. Cl. .................................. 398/209; 398/211

(58) Field of Classification Search ............... 359/122, 359/124, 161, 156; 398/202–214
See application file for complete search history.

(56) References Cited

U.S. PATENT DOCUMENTS

| | | | |
|---|---|---|---|
| 5,212,743 A | 5/1993 | Heismann | 835/11 |
| 5,600,738 A | 2/1997 | Bergland et al. | 385/11 |
| 5,659,412 A | 8/1997 | Hakki | 359/156 |
| 5,793,511 A * | 8/1998 | Bulow | 359/161 |
| 5,859,939 A | 1/1999 | Fee et al. | 385/24 |
| 5,930,414 A * | 7/1999 | Fishman et al. | 385/11 |
| 6,104,515 A | 8/2000 | Cao | 359/161 |
| 6,130,766 A * | 10/2000 | Cao | 359/161 |
| 6,134,033 A * | 10/2000 | Bergano et al. | 359/122 |

FOREIGN PATENT DOCUMENTS

| | | |
|---|---|---|
| EP | 0812075 | 12/1997 |
| EP | 0984571 | 3/2000 |

OTHER PUBLICATIONS

H. Rosenfeldt, et al., "First Order PMD-Compensation in a 10 Gbit/s NRZ Field Experiment Using a Polarimetric Feedback-Signal," ECOC, pp. II-134-II-135, 1999.
H. Rosenfeldt, et al., "PMD Compensation in a 10 Gbit/s NRZ field experiment using polarimetric error signal," Electronics Letters, vol. 36, No. 5, 2000.
Neal S. Bergano, et al., "Margin Measurements in Optical Amplifier Systems", IEEE Photonics Technology Letters, vol. 5, No. 3, pp. 304-306, Mar. 1993.

* cited by examiner

*Primary Examiner*—Agustin Bello
(74) *Attorney, Agent, or Firm*—Dougherty Clements; Christopher L. Bernard; Tyler S. Brown

(57) ABSTRACT

Residual birefringence in optical fibers causes polarization mode dispersion (PMD). The invention compensates for this by using a polarization mode dispersion compensator and a polarimeter. The PMD compensator has a variable PMD that may be controlled. The output of the PMD compensator is monitored by a polarimeter. By dithering the wavelength of the optical signal, the polarimeter may provide an accurate measure of the PMD. A controller uses this measurement to control the PMD compensator. The PMD compensating scheme may also be incorporated in a wavelength division multiplexed system with each channel having its own PMD compensator. In addition, a control method may control any polarization mode dispersion compensator based on feedback from a polarimeter to reduce the PMD of the input signal. Instead of using a polarimeter, a Q detector may be used to monitor the output of the PMD compensator. The Q detector provides a measurement of the edge sharpness and, thereby, a measure of the PMD. The controller may use the Q value to control the PMD compensator.

23 Claims, 7 Drawing Sheets

POLARIZATION MODE DISPERSION COMPENSATING APPARATUS, SYSTEM, AND METHOD

BACKGROUND OF THE INVENTION

1. Field of Invention

The present invention relates to optical communications systems. More particularly, the present invention relates to polarization mode dispersion compensating systems and methods.

2. Description of Related Art

Polarization mode dispersion (PMD) is a well-known problem caused by the undesired, residual birefringent properties of optical fibers. Despite the attempts of optical fiber manufacturers to eliminate PMD, a residual amount of PMD is still present. Moreover, there are a variety of existing fiber plants having fibers not optimized to reduce PMD.

Essentially, PMD causes the two principal states of polarization to propagate along an optical fiber at different rates. The polarization of an optical signal may be expressed in terms of two components (the so-called "principal states of polarization" (POS)). The two principal polarization states each experience different propagation delays as they propagate down a length of optical fiber due to the residual birefringence of the fiber. The result of the time delay ($\tau$) between the two principal states (also referred to as differential group delay, or DGD) is that the signal is distorted. The time delay ($\tau$) may be on the order of 10–20 ps for a 100 km fiber More accurately, DGD exhibits a gaussian distribution. DGD values, such as the 10–20 ps mentioned above, are usually a mean value of this gaussian distribution. However, the Gaussian distribution means that there is a likelihood of a DGD value much larger than the mean. Such large DGD values can cause optical signal pulses (composed of both principal polarization states) to broaden to such an extent that intersymbol interference occurs and the bit error rate (BER) rises.

In addition, higher data rates and longer transmission distances make even small PMD values a more significant problem than in the past. For example, at 10 Gb/s only 100 ps separates each pulse. Thus, a 50 ps PMD could easily cause a bit error. The progression to 40 Gb/s and higher will make PMD compensation an important problem to solve.

Exacerbating these problems is the fact that PMD varies with time, fiber temperature, and fiber stress. For example, a technician moving a fiber will stress the fiber and induce fluctuating PMD. Temperature cycling will also cause a fluctuating PMD. Thus, a PMD compensator having a fixed amount of counter-PMD will not adequately offset the time-varying PMD.

To address these problems, various PMD compensation schemes have been invented. Many of these schemes employ variable time-delay elements that subject one of the two principal polarization states to a variable delay in order to align the phases of the principal states.

Fee et al. (U.S. Pat. No. 5,859,939) is an example of such a variable delay element approach. Fee's polarization beam splitter splits the input beam in order to detect the delay between the principal polarization states. Incremental delay elements made from different lengths of optical fiber are then switched into the optical path of one (or both) of the principal polarization states in order to align the phases thereof. The phase-compensated principal states are then combined, hopefully with a reduced PMD.

Hakki (U.S. Pat. No. 5,659,412) is another example of such a variable time-delay element approach. Hakki uses a polarization beam splitter to split the incoming signal into transverse electric (TE) and transverse magnetic (TM) polarized components after a polarization controller aligns the PSPs of the received optical signal with the polarization axes of the beam splitter. The TM component is delayed by a variable electrical delay element. A phase detection circuit measures a phase difference between the components and is used to control the variable electrical delay element and the polarization controller. The compensated components are then combined and fed to a receiver (decision circuit).

SUMMARY OF THE INVENTION

The invention corrects the polarization mode dispersion of an input signal by controlling a polarization mode dispersion compensator having a variable PMD so as to generate a PMD vector of equal magnitude but opposite direction to the PMD vector of the input signal. Mathematically, the input signal has a PMD that may be expressed as a vector on the Poincare sphere having an associated magnitude and direction ($\theta,\phi$). Generally speaking the invention controls a polarization mode dispersion compensator to generate a counter-PMD vector of equal magnitude and opposing direction ($-\theta,\phi$) thereto.

More specifically, the invention may be implemented as a polarization mode dispersion compensating apparatus, including: a polarization mode dispersion compensator optically coupled to an input port and receiving an input optical signal having polarization mode dispersion and a wavelength dither, the polarization mode dispersion compensator having a variable polarization mode dispersion; a polarimeter optically coupled to the output of the polarization mode dispersion compensator and outputting an electrical signal representing polarization states of the optical signal; and a controller operatively coupled to the polarimeter and the polarization mode compensator, the controller receiving the electrical signal from the and controlling the polarization mode dispersion compensator according to the electrical signal to compensate for the polarization mode dispersion of the input optical signal.

Furthermore, a signal source for generating the input optical signal with the wavelength dither may be used wherein the input optical signal is transmitted across optical fiber and/or components that cause the input signal to have the polarization mode dispersion.

The polarimeter may include a first polarizer optically coupled to the polarization mode dispersion compensator, the first polarizer plane polarizing an optical signal output from the polarization mode dispersion compensator at first polarization angle; a second polarizer optically coupled to the polarization mode dispersion compensator, the second polarizer plane polarizing an optical signal output from the polarization mode dispersion compensator at a second angle different than the first angle; a third polarizer optically coupled to the polarization mode dispersion compensator, the third polarizer circularly polarizing an optical signal output from the polarization mode dispersion compensator; and three photodetectors receiving the outputs of the first, second and third polarizers In addition, the controller may control the polarization mode dispersion compensator so as to minimize a sum of the squares of the first, second and third detection signals to compensate for the polarization mode dispersion of the input optical signal.

Moreover, the controller may utilize an adaptive learning algorithm to minimize the sum of the squares of the first, second and third detection signals to better compensate for the polarization mode dispersion of the input optical signal. The PMD compensating apparatus may also be used in a wavelength division multiplexed optical communication system.

A method of compensating an optical signal having polarization mode dispersion is also disclosed and includes: dithering a wavelength of the optical signal so as to vary around a center wavelength; compensating the polarization mode dispersion of the optical signal with a variable polarization mode dispersion compensator; polarizing an optical signal output from the variable polarization mode dispersion compensator to generate polarized component optical signals; detecting polarized component optical signals to generate detection signals; and controlling said compensating step according to the detection signals.

The polarizing step may include subjecting the optical signal output from the variable polarization mode dispersion compensator to plane polarization at a first polarization angle, plane polarization at a second angle different that the first angle, and circular polarization; the detecting step detecting the three polarized optical signals to output a first, second and third detection signal.

Control of the PMD may be further achieved by minimizing a sum of the squares of the first, second, and third detection signals.

Another polarization mode dispersion compensating system according to the invention includes: a polarization mode dispersion compensator optically coupled to an input port and receiving an input optical signal having polarization mode dispersion, said polarization mode dispersion compensator having a variable polarization mode dispersion; a Q detector operatively coupled to said polarization mode dispersion compensator, said Q detector outputting an electrical signal representing an edge sharpness of the optical signal output from said polarization mode dispersion compensator; and a controller operatively coupled to said Q detector and to said polarization mode dispersion compensator, said controller receiving the electrical signal from said Q detector; said controller controlling said polarization mode dispersion compensator to minimize the Q represented by the electrical signal to compensate for the polarization mode dispersion of the input signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Figure 1:
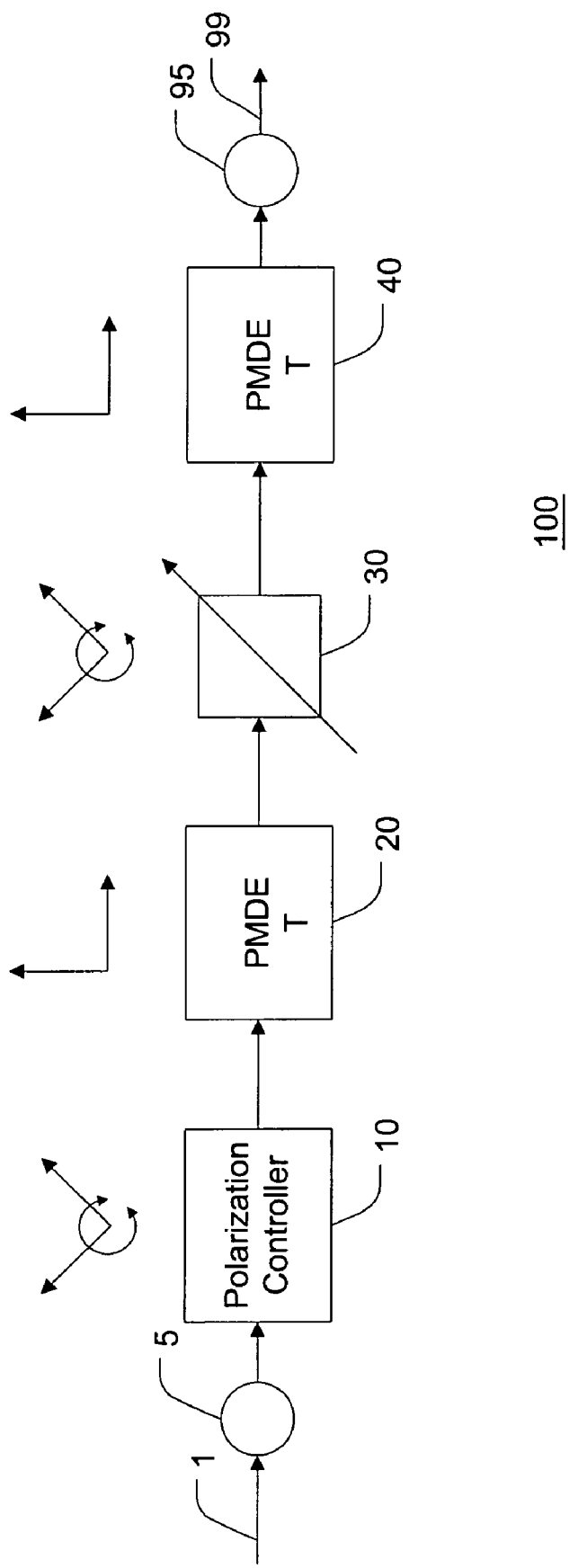
FIG. 1 is a block diagram showing a polarization mode dispersion compensating apparatus according to the invention.
Figure 2:
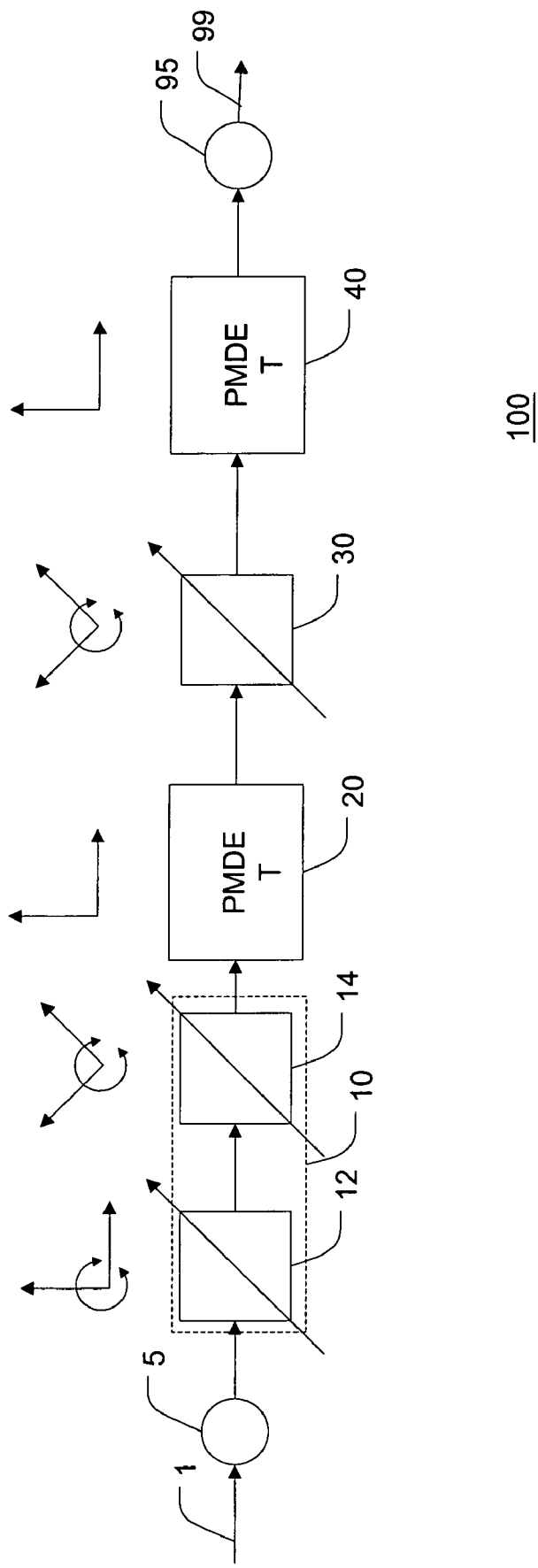
FIG. 2 is a block diagram showing an example of how a polarization controller may be implemented in the inventive polarization mode dispersion compensating apparatus.

FIG. 1 illustrates the main components of the polarization compensator 100. An input port 5 receives an input optical signal 1 suffering from PMD. The input port 5 may be, for example, a connector, splice or other connection between the polarization compensator 100 and the optical fiber carrying the input signal 1.

The PMD compensator 100 of the invention seeks to counter or oppose the PMD vector of the input signal 1. To that end, two polarization mode dispersion elements (PMDEs) 20, 40 are used as sources of opposing PMD magnitude. In FIG. 1 each of the PMDEs 20, 40 has an associated PMD magnitude T. The assignation of value T is for the sake of rapid understanding as this value could vary from PMDE 20 to PMDE 40.

The PMDEs 20, 40 may be constructed with a length of fiber. To save space, these lengths of fiber are preferably constructed with fiber having a large birefiingent property. By using the same fiber type and cutting each fiber section to the same length equal values of T may be obtained for the PMDEs 20, 40. As noted above, however, T may vary from PMDE 20 to PMDE 40. Moreover, PMDEs 20, 40 may be constructed with any other birefringent material or device such as a section of birefringent crystal.

Furthermore, the PMDEs 20, 40 of the invention have a relative angle θ between the polarization mode dispersions of the PMDEs 20, 40. To control this angle θ a retarder 30 is placed between and optically coupled to the PMDEs 20, 40. The retarder 30 may be constructed from a variety of devices such as a variable waveplate built from distributed bulk optic devices, liquid crystal devices, or integrated electrooptic waveguide devices as is known in the art.

The principal polarization axes of the variable retarder 30 are preferably at 45 degrees to the principal polarization axes of the PMDEs 20, 40. This relationship is indicated by the axes above each of the elements. The variability of variable retarder 30s principal axes is further indicated by an arc having two arrows.

The retarder 30 varies the angle θ between the PMD vectors T of the PMDEs 20, 40. Mathematically, the magnitude of the vector sum is 2Tsin (θ/2).

The PMD compensator 100 may compensate for a differential group delay τ within a range of:

$$0 < \tau < 2T,$$

In other words, given an expected phase shift τ between the two polarization components of the input signal 1, the PMDEs 20, 40 must have a PMD sum (2T) greater than the expected phase shift τ. For greater amounts of PMD compensation, additional PMDE's or PMD compensators 100 may be combined such as in a cascade configuration.

To complete the PMD compensator 100 elements, a polarization controller 10 is optically coupled to the input port 5. Polarization controller 10 varies the orientation of the input signal's polarization axes to align with and oppose the polarization axes of the PMDEs 20, 40.

Polarization controller 10 may be implemented with a variety of known devices including liquid crystal devices and integrated electrooptic devices. In a bulk optic device embodiment, the polarization controller may be constructed with a pair of quarter waveplates sandwiching a half-wave plate. By rotating the quarter-waveplates, the polarization axes may be rotated.

An integrated electrooptic implementation for the polarization controller 10 could also be used in which, for example, a LiNBO$_3$ crystal is fabricated to include a waveguide structure with three cascaded electrode sections that have linear birefringence of variable orientation but constant phase retardation. The phase retardation is a series of quarter/half/quarter phase retardation just like the bulk optic device but instead of using mechanical rotating elements a voltage may be applied to vary the orientations. Further details of such devices may be found in the literature. See, for example, U.S. Pat. No. 5,212,743.

As mentioned in the background section, the PMD of the input signal varies with time. To control the PMD compensator 100 so as to adapt to the time-varying PMD, the invention further includes a variety of structures and methods.

Figure 3:
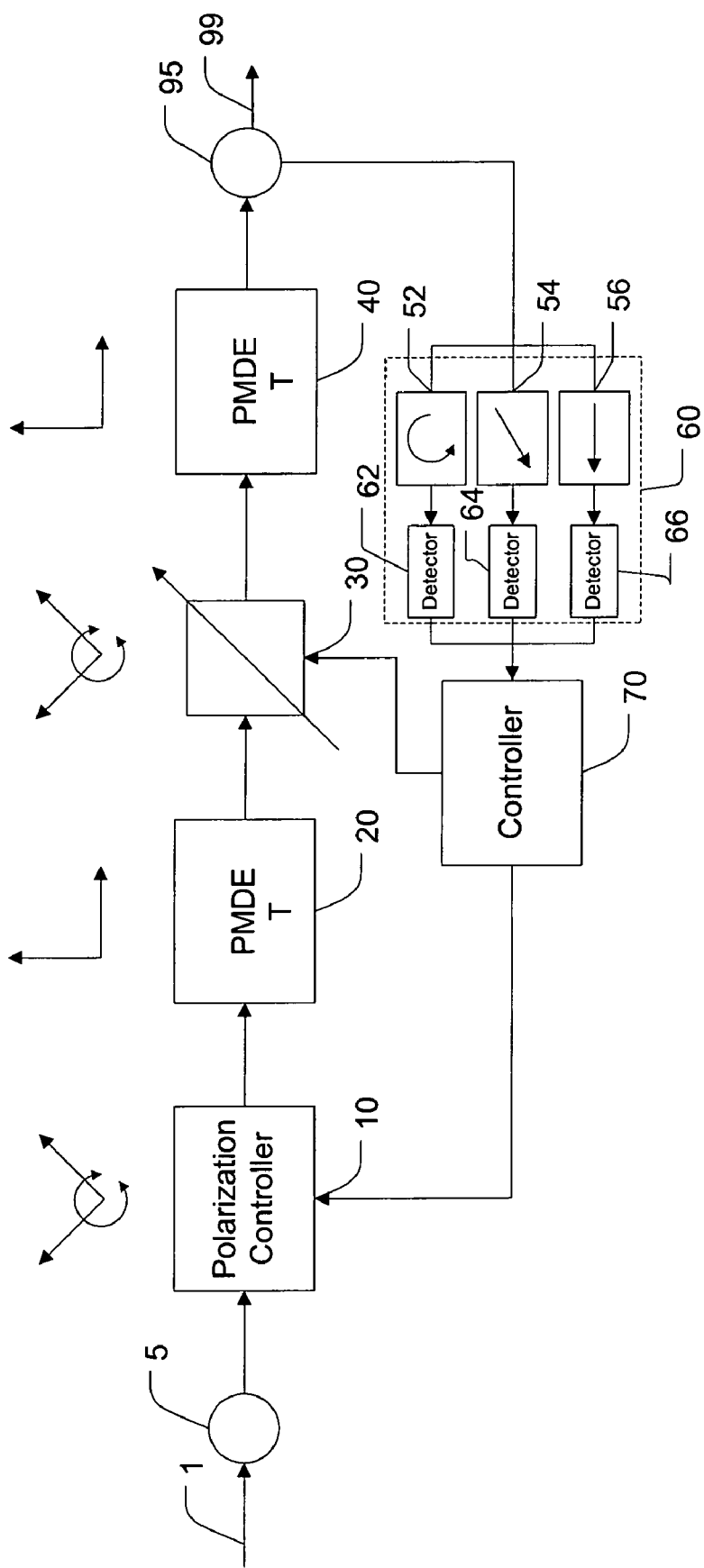
FIG. 3 is a block diagram of a polarization mode dispersion compensating system according to a first embodiment of the invention.

FIG. 3 illustrates a first embodiment of a PMD measuring and control structure. The output port 95 may include a tap, splitter or coupler that takes a portion of the output signal 99 and feeds it to a polarimeter 60.

Polarimeter 60 may be constructed in a variety of fashions as is known in the art (e.g. some of which are commercially available such as the HP-8509).

FIG. 3 provides an example of a polarimeter 60 structure according to the invention. Three polarizers 52, 54, 56 each receive a portion of the output signal 99. An internal splitter may be used to supply each of the polarizers 52, 54, 56 with a portion of the output light signal 99. As shown, the polarizers 52, 54, 56 have different polarizations (circular, plane polarization at a first angle, and plane polarization at a second angle different than the first angle ((e.g. 45 degrees to the first angle)) that respectively polarize the light incident thereon. The respectively polarized light signals then impinge photodetectors 62, 64, 66 for measurement. Each of the polarization states (P1, P2, and P3) may be represented as detected amounts (d1, d2, and d3).

The polarimeter 60 may include other polarizers different from or in addition to the ones shown in FIG. 3. For example, a combination of elliptical polarizers having different polarization orientations could be used as a substitute or in addition to the polarizers 52, 54, 56. For simplicity, a set of three polarizers 52, 54, 56 is sufficient for the invention to operate properly. In other words, the set of three polarizers 52, 54, 56 permits the invention to "see" a polarization state with three degrees of freedom and thereby effect control over a full range of PMDs.

To further effect control, the source wavelength of the input signal 1 is dithered or otherwise varied by a small amount. Preferably, the wavelength variation in the dither is small enough to not trigger other problems such as significant cross talk with any other channels that may be present. To dither the source wavelength, the control voltage of the source laser (e.g. a semiconductor laser device) may be varied by a small amount. The dither may be a sinusoid, square wave, triangle wave or any other wavelength variation imposed on the main signal wavelength.

Dithering the source permits the PMD to be observed. Given that a signal passes through a path having PMD, the output state of polarization (SOP) changes as a function of wavelength. The invention exploits this phenomenon by intentionally varying the source wavelength and observing the resulting changes to the SOP. When the net PMD of the communication system plus the compensator is small, this results in a small change in the dither observed by the polarimeter 60. In other words, when the PMD compensator is set correctly, the observed dither in the SOP by polarimeter 60 is small.

Specifically, detectors 62, 64, 66 observe respective polarized components of this dither. The output of the detectors is an accurate measure of the input signal's PMD. The dithering wavelength shows up as a varying detection output from the detectors 62, 64, 66.

Controller 70 receives the detected, polarized components from detectors 62, 64, 66. Using a processing algorithm or digital signal processing (DSP) chip the controller 70 can recover the content of the dither (e.g. the frequency of the dither). In this way, the signal source of the optical signal need not transmit the dither content to the controller 70.

Controller 70 utilizes the detected polarized components and dither information from the detectors 62, 64, 66 to control the PMD compensator 100 so as to minimize PMD of the input signal plus the PMD of the inventive components. If the PMD compensator 100 is used, then the controller uses the detected polarized dither to control the retarder 30 and the polarization controller 10 to minimize $(d1)^2+(d2)^2+(d3)^2$. If another type of PMD compensator is used, then the controller 70 may adjust the control voltages of such a PMD compensator so as to minimize $(d1)^2+(d2)^2+(d3)^2$.

The controller 70 may be constructed with a variety of components such as computer programmed with software embodying the inventive methods. Other hardware, firmware and/or software may also be used to perform the inventive methods. Furthermore, the controller 70 may be constructed with an ASIC (application specific integrated circuit) which would add a speed advantage over a software-programmed computer. The specific implementation and/or programming of these devices is a routine matter to one of ordinary skill in the art.

The controller 70 may also utilize an adaptive learning algorithm to improve the degree of control and to better compensate for the PMD of the input signal 1. A variety of conventional adaptive learning algorithms may be applied by the invention such as, for example, neural networks, expert systems, and statistical learning algorithms. Such adaptive learning algorithms would accept as inputs the d1, d2 and d3 values from the polarimeter 60 to generate output control signals for the polarization controller 10 and the variable retarder 30.

Preferably, the adaptive learning algorithm in the controller 70 would be permitted learn while the system is not carrying live traffic. In other words, the PMD system could be connected to a fiber receiving a test input signal 1 for a period of time sufficient for the controller 70 to adapt to the time-varying PMD of the input signal 1 and converge solutions thereto that minimize the PMD of the output signal 99. Thereafter, the input signal 1 may 4 be a live traffic signal which could be best compensated by an already-trained controller 70. Of course, controller 70 may still continue learning while live traffic is sent through the PMD compensator 100.

Figure 4:
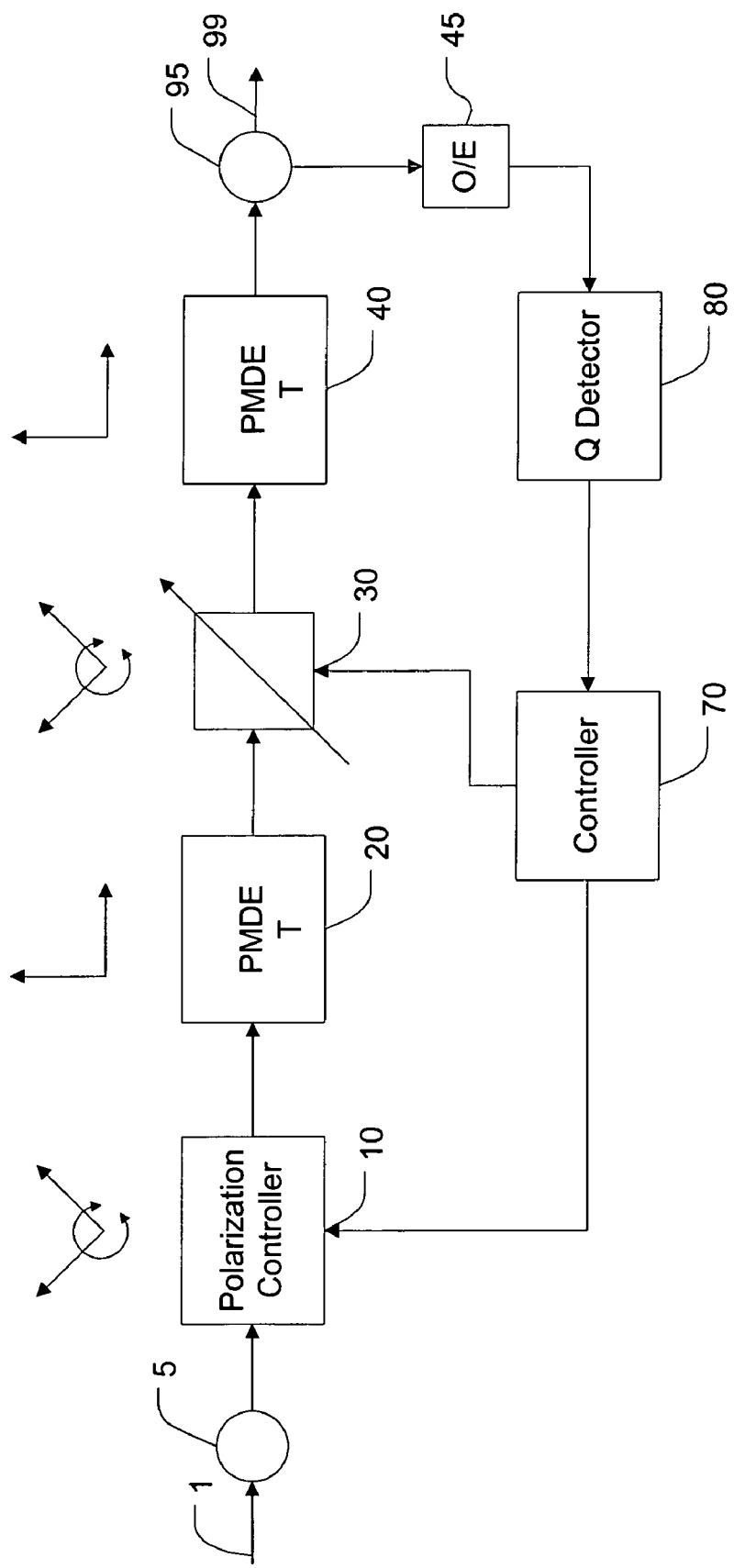
FIG. 4 is a block diagram of a polarization mode dispersion compensating system according to a second embodiment of the invention.

FIG. 4 illustrates a second embodiment of the invention. The second embodiment shares many components with the first embodiment with the differences being in the control structure and operation. Instead of using a polarimeter 60 as in the first embodiment, the second embodiment uses a Q detector 80. The signal quality Q of the signal output from the PMD compensator 100 is a measure of the signal pulse sharpness and may be quantitatively measured using conventional techniques.

Because such Q detectors 80 typically operate on electrical signals, a O/E (optical-to-electrical) converter 45 is used. The O/E converter 45 may be constructed with, for example, a photodetector.

The controller 70 of the second embodiment shown in FIG. 4 operates in much the same way as in the first embodiment except that the input is a Q value. Based on the signal quality measure Q, the controller 70 controls the retarder 30 and the polarization controller 10 so as to maximize Q. A maximized Q corresponds to sharp pulse edge transitions which means that PMD of the input signal 1 has been minimized. In other words, PMD causes pulse spreading and less-sharp edge transitions. Q is a measure of the edge sharpness and therefore, a measure of PMD compensation effectiveness. By maximizing Q, the controller 70 will substantially eliminate the PMD of the input signal 1.

In general, the first embodiment in which a polarimeter 60 is utilized to provide control information is generally preferred over the second embodiment in which the Q detector 80 is utilized. One reason is that the d1, d2, d3 information is more detailed and indicative of the input signal's PMD that the Q value. Thus, a more precise control and more substantial elimination of the input signal's PMD may be effectuated with the information from the polarimeter 60 than with the information from the Q detector 80.

Furthermore, current implementations of Q detectors 80 are rather slow particularly when compared with the polarimeter 60 that may be constructed with high-speed photodetectors 62, 64, 66. The reason is that the measurements and calculations necessary to detect Q are complex and time-consuming.

Figure 5:
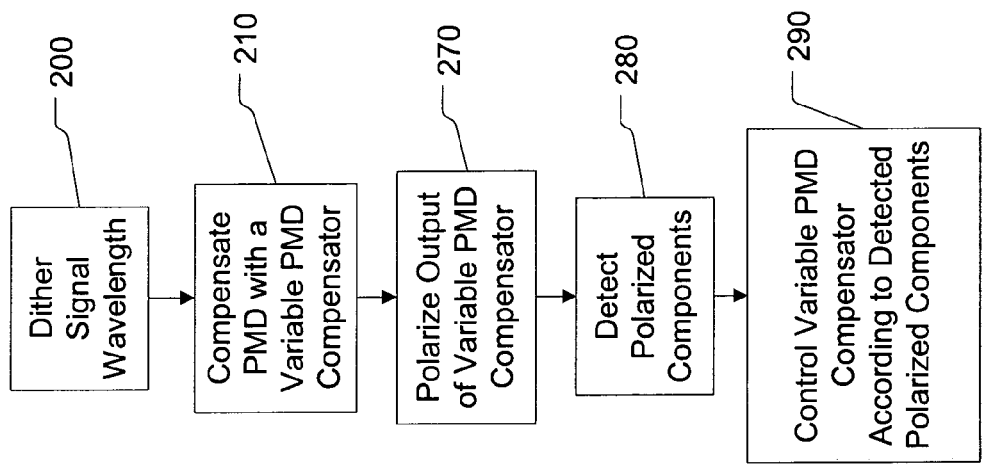
FIG. 5 is a high-level flowchart illustrating a generalized method of polarization mode dispersion compensation.

FIG. 5 further describes the operation of the invention and generalizes the control method to any type of polarization mode dispersion compensator having a variable polarization mode dispersion. As shown therein, the inventive method dithers the signal wavelength (200). Dithering, in and of itself, may be accomplished with a variety of devices and the inventive method may work with any such device as long as the wavelength is varied by some small amount (preferably small enough not to interfere with other components) and by a frequency high enough to effectively compensate for the time-varying PMD.

As further shown in FIG. 5, the method proceeds by compensating the optical signal's PMD (210) with a variable PMD compensator. Although the hardware described above in relation to FIGS. 1–4 may be utilized, the inventive control method is not limited thereto and may include the split path approaches of, for example, Hakki; a fixed element approach (multiple or single fixed birefringent compensating elements); or any other device capable of varying PMD and to which a control signal may be applied to controllably vary the PMD.

Next, the method polarizes the output (270) of the variable PMD compensator. Any polarimeter may be used and the invention is not limited to the polarimeter 60 shown in FIG. 3 and described above. The polarized components are then detected (270). Preferably, the detection step should "see" at least three distinct polarized components output from the polarimeter in order to determine the polarization state to three degrees of freedom and thereby provide the ability to accurately control the PMD compensation (290).

If the PMD compensator 100 is used by the method, then the control step 290 may control the retarder 30 and polarization controller 10. If another PMD compensator is used, then the control step 290 would control the appropriate control voltages. To achieve PMD compensation, control step 290 preferably minimizes $(d1)^2+(d2)^2+(d3)^2$.

Figure 6:
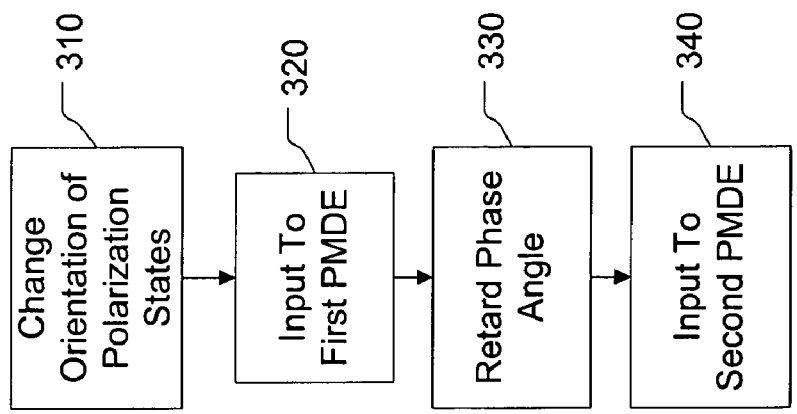
FIG. 6 is a high-level flowchart illustrating an adaptation of the generalized method of polarization mode dispersion compensation to a particular type of PMD compensator.

FIG. 6 further illustrates the adaptation of the generalized method of FIG. 5 to the particular PMD compensator 100 shown in FIGS. 1–4. To adapt, the control step 290 would include the steps 310–340 of FIG. 6. More specifically, the method would change the orientation of the polarization states (310) by controlling the polarization controller 10. The signal would then be input to the first PMDE (step 32) by supplying the signal from the polarization controller 10 to the PMDE 20. The phase angle would then be retarded (330) by controlling the retarder 30. The output of the retarder is supplied to the input of the second PMDE (step 340). The method controls steps 310 and 330 to minimize $(d1)^2+(d2)^2+(d3)^2$ and thereby reduces the PMD of the input optical signal so that a compensated signal 99 is output.

Figure 7:
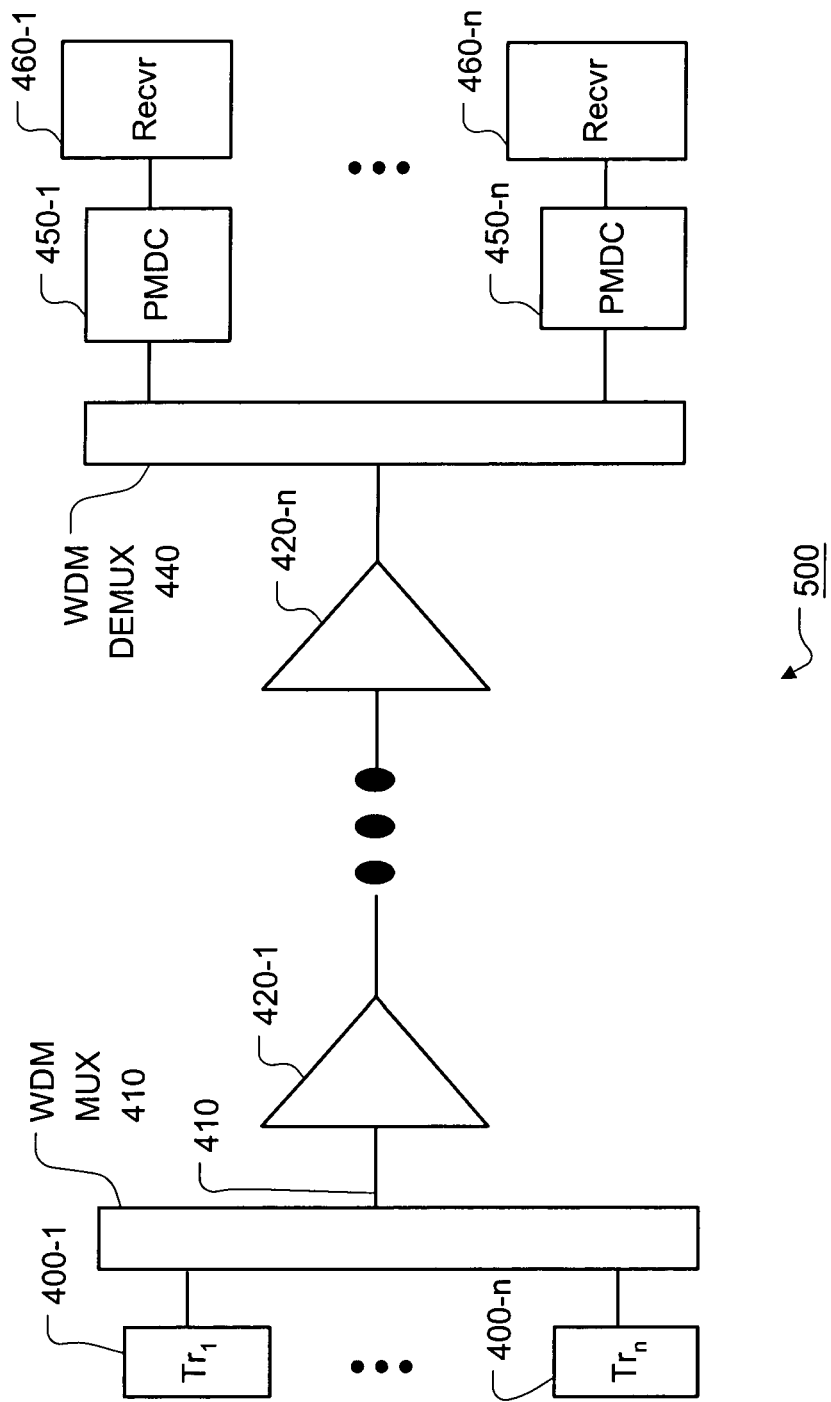
FIG. 7 is a block diagram of a wavelength division multiplexed communication system incorporation the polarization mode dispersion compensating apparatus of the invention.

FIG. 7 illustrates a WDM (wavelength division multiplexed) system 500 incorporating the invention. Because PMD varies according to wavelength, each channel of the WDM system 500 should have its own PMDC (polarization mode compensator).

Specifically, the WDM system 500 includes a plurality of transmitters $Tr_1$ to $Tr_n$ (400-1 to 400-n) each of which emits one of a plurality of optical signals. Each of the plurality of optical signals are at a respective one of a plurality of wavelengths.

Furthermore each $Tr_1$ to $Tr_n$ (400-1 to 400-n) imposes a dither on the respective wavelength being output therefrom. A common dither control circuit (not shown) may be used to reduce components.

The dithered optical signals are output from $Tr_1$ to $Tr_n$ (400-1 to 400-n) and combined using a conventional WDM multiplexer 410, onto an optical communication path 410, comprising, for example, an optical fiber.

To transmit over long distances, chain of optical amplifiers 420-1 to 420-n are typically coupled in series along optical communication path 410. If a long distance is not being traversed or if other forms of amplification such as Raman amps are used which do not require an amp repeater chain, then optical amplifiers 420-1 to 420-n may be eliminated entirely.

A WDM demultiplexer 440 is coupled to optical communication path 410 at the end of the amplifier chain (if present). Each of the outputs of WDM demultiplexer 410 are coupled to a respective one of PMDCs 450-1 to 450-n, which perform PMD compensation according to the techniques described above. Each of the PMDCs 450-1 to 450-n may be constructed as described above and may include the PMD compensator 100 or any other PMD compensator using the control methodologies of FIG. 5 or employing the Q detector 80 and associated control.

The PMD compensated signal 99 output from each of the PMDCs 450-1 to 450-n may then be supplied to receivers 460-1 to 460-n. Because of the PMD compensation, the BER of the received signal should be reduced with respect to an uncompensated signal.

Alternatively, a PMDC 450 may be provided at the output of an OADM (optical add drop multiplexer) to provide PMD compensation before detection of the signal or before supplying the signal to another optical path. If more than one channel is being dropped then a corresponding number of PMDCs 450 should be used to provide PMD compensation.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A polarization mode dispersion compensating apparatus, comprising:
   a polarization mode dispersion compensator optically coupled to an input port and receiving an input optical signal having polarization mode dispersion and a wavelength dither, said polarization mode dispersion compensator having a variable polarization mode dispersion, and an output of said polarization mode dispersion compensator serving as an output of the polarization mode dispersion compensating apparatus;
   a polarimeter optically coupled to the output of said polarization mode dispersion compensator and outputting electrical signals representing polarization states of the output of said polarization mode dispersion compensator; and
   a controller operatively coupled to said polarimeter and said polarization mode compensator, said controller receiving the electrical signals from said polarimeter, said controller controlling said polarization mode dispersion compensator according to the electrical signal to compensate for the polarization mode dispersion of the input optical signal.

2. The polarization mode dispersion compensating apparatus according to claim 1, further comprising a signal source for generating the input optical signal with the wavelength dither, wherein the input optical signal is transmitted across optical fiber and/or components that cause the input signal to have the polarization mode dispersion.

3. The polarization mode dispersion compensating apparatus according to claim 1, said polarimeter including:
   a first polarizer optically coupled to said polarization mode dispersion compensator, said first polarizer plane polarizing the optical signal output from said polarization mode dispersion compensator at first polarization angle;
   a second polarizer optically coupled to said polarization mode dispersion compensator, said second polarizer plane polarizing the optical signal output from said polarization mode dispersion compensator at a second angle different than the first angle;
   a third polarizer optically coupled to said polarization mode dispersion compensator, said third polarizer circularly polarizing the optical signal output from said polarization mode dispersion compensator;
   a first photodetector optically coupled to said first polarizer and outputting a first detection signal;
   a second photodetector optically coupled to said second polarizer and outputting a second detection signal; and
   a third photodetector optically coupled to said third polarizer and outputting a third detection signal.

4. The polarization mode dispersion compensating apparatus according to claim 1, said controller controlling said polarization mode dispersion compensator so as to minimize a sum of the squares of the first, second and third detection signals to compensate for the polarization mode dispersion of the input optical signal.

5. The polarization mode dispersion compensating apparatus according to claim 4, said controller utilizing an adaptive learning algorithm to further minimize the sum of the squares of the first, second and third detection signals and further compensate for the polarization mode dispersion of the input optical signal.

6. The polarization mode dispersion compensating apparatus according to claim 1, said polarization mode dispersion compensator including:
   a polarization controller optically coupled to the input port and receiving the input optical signal;
   a first birefringent component optically coupled to said polarization controller;
   a variable retarder optically coupled to said first birefringent component; and
   a second birefringent component optically coupled to said variable retarder, said controller being operatively coupled to said polarimeter, said variable retarder and said polarization controller, and said controller controlling said variable retarder and said polarization controller according to the electrical signal to compensate for the polarization mode dispersion of the input signal.

7. The polarization mode dispersion compensating apparatus according to claim 6, wherein said polarization controller and said retarder are integrated electrooptic waveguide devices or liquid crystal components.

8. The polarization mode dispersion compensating apparatus according to claim 6, said polarimeter including:
   a first polarizer optically coupled to said second birefringent component, said first polarizer plane polarizing an optical signal output from said second birefringent component at an angle parallel to an optic axis;
   a second polarizer optically coupled to said second birefringent component, said second polarizer plane polarizing the optical signal output from said second birefringent component at an angle not parallel to the optic axis;
   a third polarizer optically coupled to said second birefringent component, said third polarizer plane circularly polarizing the optical signal output from said second birefringent component;
   a first photodetector optically coupled to said first polarizer and outputting a first detection signal;
   a second photodetector optically coupled to said second polarizer and outputting a second detection signal; and
   a third photodetector optically coupled to said third polarizer and outputting a third detection signal.

9. The polarization mode dispersion compensating apparatus according to claim 8, said controller controlling said polarization mode dispersion compensator so as to minimize a sum of the squares of the first, second and third detection signals to compensate for the polarization mode dispersion of the input optical signal.

10. The polarization mode dispersion compensating apparatus according to claim 1, wherein said polarimeter detects said polarization states of the output of said polarization mode dispersion compensator in at least three degrees of freedom.

11. A wavelength division multiplexed optical communication system, comprising:
   a plurality of optical transmitters, each emitting a corresponding one of a plurality of optical signals, each of the plurality of optical signals being at a respective one of a plurality of wavelengths and having a respective wavelength dither;
   an optical combiner having a plurality of inputs, each of the plurality of inputs being coupled to a respective one of said plurality of optical transmitters, and an output supplying the plurality of optical signals to a first end portion of an optical communication path;
   an optical demultiplexer having an input configured to be coupled to a second end portion of the optical communication path, and a plurality of outputs, each of the plurality of outputs of said optical demultiplexer supplying a respective one of the plurality of optical signals;
   a plurality of polarization mode dispersion compensating apparatuses according to claim 1, each of the apparatuses being coupled to a respective one of the plurality of outputs of said optical demultiplexer;
   a plurality of optical receivers, each of the receivers being coupled to a respective one of the plurality of outputs of said polarization mode compensating apparatuses.

12. The wavelength division multiplexed optical communication system according to claim 11, further comprising:
   a plurality of optical amplification devices arranged in series along the optical communication path.

13. The wavelength division multiplexed optical communication according to claim 11, wherein at least one polarization mode dispersion apparatus includes a polarimeter configured to detect polarization states of an output of a corresponding polarization mode dispersion compensator in at least three degrees of freedom.

14. A method of compensating an input optical signal having polarization mode dispersion, comprising:
   dithering a wavelength of the input optical signal so as to vary around a center wavelength;
   compensating the polarization mode dispersion of the input optical signal with a variable polarization mode dispersion compensator, wherein an optical signal output of a polarization mode dispersion compensator serves as an output of a polarization mode dispersion compensating apparatus;
   polarizing the optical signal output from the variable polarization mode dispersion compensator to generate polarized component optical signals;
   detecting polarized component optical signals to generate detection signals; and
   controlling said compensating step according to the detection signals.

15. The method of compensating an optical signal having polarization mode dispersion according to claim 14, wherein:
   said polarizing step includes subjecting the optical signal output from the variable polarization mode dispersion compensator to plane polarization at a first polarization angle, plane polarization at a second angle different that the first angle, and circular polarization; and
   said detecting step includes detecting the three polarized optical signals to output a first, second and third detection signals.

16. The method of compensating an optical signal having polarization mode dispersion according to claim 15, wherein said controlling step includes controlling said compensating step according to the first, second, and third detection signals.

17. The method of compensating an optical signal having polarization mode dispersion according to claim 16, wherein said controlling step includes minimizing a sum of the squares of the first, second, and third detection signals.

18. The method of compensating an optical signal having polarization mode dispersion according to claim 17, wherein said controlling step includes adaptively learning to minimize the sum of the squares of the first, second, and third detection signals.

19. The method of compensating an optical signal having polarization mode dispersion according to claim 14,
   wherein said compensating step includes:
      changing principal polarization states of the optical signal;
      inputting the optical signal from said controlling step to a first polarization mode compensating element;
      retarding a phase angle of principal polarization states of the optical signal output from the first polarization mode compensating element; and
      inputting the optical signal from said retarding step to a second polarization mode compensating element;
   wherein said polarizing step includes subjecting the optical signal output from the variable polarization mode dispersion compensator to plane polarization at a first polarization angle, plane polarization at a second angle different that the first angle, and circular polarization;
   wherein said detecting step includes detecting the three polarized optical signals to output a first, second and third detection signal; and
   wherein said controlling step includes controlling said changing step and said retarding step according to the first, second, and third detection signals.

20. The method of compensating an optical signal having polarization mode dispersion according to claim 19, wherein said controlling step includes minimizing a sum of the squares the first, second, and third detection signals.

21. The method of compensating an optical signal having polarization mode dispersion according to claim 14, wherein said polarizing step includes generating the polarized component optical signals in at least three degrees of freedom.

22. A polarization mode dispersion compensating system, comprising:
   a polarization mode dispersion compensator optically coupled to an input port and receiving an input optical signal having polarization mode dispersion, said polarization mode dispersion compensator having a variable polarization mode dispersion, and an output of said polarization mode dispersion compensator serving as an output of the polarization mode dispersion compensating system;
   a Q detector operatively coupled to the output of said polarization mode dispersion compensator, said Q detector outputting an electrical signal representing an edge sharpness of the optical signal output from said polarization mode dispersion compensator; and a controller operatively coupled to said Q detector and to said polarization mode dispersion compensator, said controller receiving the electrical signal from said Q detector;

said controller controlling said polarization mode dispersion compensator to minimize the Q represented by the electrical signal to compensate for the polarization mode dispersion of the input signal.

23. The polarization mode dispersion compensating system according to claim 22, wherein said polarization mode compensator includes:

a polarization controller optically coupled to the input port and receiving the input optical signal having the polarization mode dispersion;

a first birefringent component optically coupled to said polarization controller;

a variable retarder optically coupled to said first birefringent component; and a second birefringent component optically coupled to said variable retarder;

wherein said controller is operatively coupled to said Q detector, said variable retarder and said polarization controller, said controller receiving the electrical signal from said Q detector; and wherein said controller controls said variable retarder and said polarization controller to minimize the Q represented by the electrical signal to compensate for the polarization mode dispersion of the input signal.

* * * * *